United States Patent
Huang et al.

(10) Patent No.: US 12,045,974 B2
(45) Date of Patent: Jul. 23, 2024

(54) TAB BENDING DETECTION METHOD AND APPARATUS, ELECTRONIC DEVICE, AND STORAGE MEDIUM

(71) Applicant: CONTEMPORARY AMPEREX TECHNOLOGY CO., LIMITED, Ningde (CN)

(72) Inventors: Qiangwei Huang, Ningde (CN); Guannan Jiang, Ningde (CN); Zhiyu Wang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/306,657

(22) Filed: Apr. 25, 2023

(65) Prior Publication Data
US 2024/0095902 A1 Mar. 21, 2024

Related U.S. Application Data

(63) Continuation of application No. PCT/CN2022/115577, filed on Aug. 29, 2022.

(51) Int. Cl.
*G06T 7/00* (2017.01)
*G06T 7/11* (2017.01)
(Continued)

(52) U.S. Cl.
CPC .............. *G06T 7/0006* (2013.01); *G06T 7/11* (2017.01); *G06T 7/187* (2017.01); *G06T 7/194* (2017.01);
(Continued)

(58) Field of Classification Search
CPC ......... G06T 7/0006; G06T 7/11; G06T 7/187; G06T 7/194; G06T 7/60; G06T 2207/30108; G06T 2207/30242
See application file for complete search history.

(56) References Cited

U.S. PATENT DOCUMENTS 11,461,916 B2 * 10/2022 Riegle .................... G06T 7/62
11,888,180 B2 * 1/2024 Findlay ............... H01M 50/213
(Continued)

FOREIGN PATENT DOCUMENTS

CN 103049753 A 4/2013
CN 108375544 A 8/2018
(Continued)

OTHER PUBLICATIONS

International Search Report for Application No. PCT/CN2022/115577, mailed Dec. 21, 2022.
(Continued)

*Primary Examiner* — Bobbak Safaipour
(74) *Attorney, Agent, or Firm* — Ladas & Parry LLP

(57) ABSTRACT

A tab bending detection method and apparatus, an electronic device, and a storage medium are provided. The method includes: performing skeleton extraction on a sectional image of multiple layers of tabs to obtain a skeleton image of the multiple layers of tabs; merging damaged connected components in the skeleton image to obtain a merged connected component, where the damaged connected components are connected components on which breaking occurs in a same tab section; calculating a target number of the multiple layers of tabs based on the merged connected component and an undamaged connected component; and detecting, based on the target number and a preset number, whether any tab in the multiple layers of tabs is in a bending state. The damaged connected components are merged to obtain the merged connected component.

10 Claims, 9 Drawing Sheets

(51) Int. Cl.
*G06T 7/187* (2017.01)
*G06T 7/194* (2017.01)
*G06T 7/60* (2017.01)

(52) U.S. Cl.
CPC ...... *G06T 7/60* (2013.01); *G06T 2207/30108* (2013.01); *G06T 2207/30242* (2013.01)

(56) References Cited

U.S. PATENT DOCUMENTS

| | | | |
|---|---|---|---|
| 2020/0227789 A1* | 7/2020 | Minamida | H01M 10/052 |
| 2021/0166053 A1 | 6/2021 | Raudies | |
| 2022/0057341 A1 | 2/2022 | Prohm et al. | |
| 2023/0289948 A1* | 9/2023 | Chen | G06T 7/187 |

FOREIGN PATENT DOCUMENTS

| | | |
|---|---|---|
| CN | 112525917 A | 3/2021 |
| CN | 113607742 A | 11/2021 |
| CN | 114018160 A | 2/2022 |
| CN | 114022479 A | 2/2022 |
| JP | 2018087740 A | 6/2018 |

OTHER PUBLICATIONS

Extended European Search Report for EP application No. 22873961.1, dated Nov. 21, 2023.

* cited by examiner

TAB BENDING DETECTION METHOD AND APPARATUS, ELECTRONIC DEVICE, AND STORAGE MEDIUM

CROSS REFERENCE TO RELATED APPLICATION

This application is a continuation of International Patent Application No. PCT/CN2022/115577, filed on Aug. 29, 2022, which is incorporated by reference in its entirety.

TECHNICAL FIELD

This application relates to the field of battery technologies, and in particular, to a tab bending detection method and apparatus, an electronic device, and a storage medium.

BACKGROUND

With rapid development of new energy vehicles, traction batteries have been widely used. A bare cell in a traction battery may be manufactured through winding, and only a part of an electrode plate wound of the cell is retained as metal foil to allow current to pass through, and this part of metal foil is a tab. The metal foil is extremely thin so that the tab is prone to bending during winding, and therefore tab bending detection has become a hot research topic.

In the related art, during tab bending detection, a line diagram corresponding to a tab region is obtained, the number of lines on a vertical section of an image corresponding to each sample point is calculated, and the maximum number of lines is taken as the actual number of tabs.

However, in the related art, it is likely that the number of tabs calculated is inaccurate, leading to inaccurate tab bending detection.

SUMMARY

This application is intended to resolve at least one of the technical problems in the prior art. In view of this, one objective of this application is to propose a tab bending detection method and apparatus, an electronic device, and a storage medium, so as to resolve the problem of inaccuracy of tab bending detection.

An embodiment of a first aspect of this application provides a tab bending detection method including:

performing skeleton extraction on a sectional image of multiple layers of tabs to obtain a skeleton image of the multiple layers of tabs; merging damaged connected components in the skeleton image to obtain a merged connected component, where the damaged connected components are connected components on which breaking occurs in a same tab section; calculating a target number of the multiple layers of tabs based on the merged connected component and an undamaged connected component; and detecting, based on the target number and a preset number, whether any tab in the multiple layers of tabs is in a bending state. The target number of the multiple layers of tabs calculated based on the merged connected component and the undamaged connected component is more accurate, thus making the tab bending detection more accurate.

In some embodiments, the merging damaged connected components in the skeleton image to obtain a merged connected component further includes: under a condition that an endpoint of a connected component is in a preset region of the skeleton image, determining, based on the endpoint, a first foreground point and a second foreground point that are adjacent to the endpoint, where the endpoint, the first foreground point, and the second foreground point are in different connected components; and merging the connected component in which the endpoint is located, a first connected component in which the first foreground point is located, and a second connected component in which the second foreground point is located to obtain the merged connected component. Under the condition that the endpoint of the connected component is in the preset region of the skeleton image, merging is performed based on the endpoint and the first foreground point and the second foreground point that are adjacent to the endpoint, making the merging result more reasonable and accurate.

In some embodiments, the merging the connected component in which the endpoint is located, a first connected component in which the first foreground point is located, and a second connected component in which the second foreground point is located to obtain the merged connected component includes: determining a first distance between the endpoint and the first foreground point and a second distance between the endpoint and the second foreground point; and under a condition that the first distance is less than the second distance, merging the first connected component in which the first foreground point is located and the connected component in which the endpoint is located to obtain the merged connected component; or under a condition that the second distance is less than the first distance, merging the second connected component in which the second foreground point is located and the connected component in which the endpoint is located to obtain the merged connected component. The first connected component and the second connected component that need to be merged with the connected component in which the endpoint is located can be accurately determined, allowing accurate merging of connected components.

In some embodiments, the calculating a target number of the multiple layers of tabs based on the merged connected component and an undamaged connected component includes: traversing each third connected component of the merged connected component and the undamaged connected component to calculate the number of tabs in each third connected component; adding the numbers of tabs in all third connected components together to obtain a first target number; and determining the target number of the multiple layers of tabs based on the first target number and the numbers of endpoints in a preset region of the merged connected component and the undamaged connected component. The target number is determined based on the first target number as well as the numbers of endpoints in a preset region in the merged connected component and the undamaged connected component, making the determined target number more accurate.

In some embodiments, the determining the target number of the multiple layers of tabs based on the first target number and the numbers of endpoints in a preset region of the merged connected component and the undamaged connected component includes: under a condition that the numbers of endpoints in a preset region are the same as the preset number, using the number of endpoints in a preset region as the target number; or under a condition that the numbers of endpoints in a preset region are different from the preset number, determining the greatest value of the numbers of endpoints in a preset region and the first target number; and determining the target number based on the greatest value and the preset number. The target number is determined based on the greatest value of the numbers of endpoints in a preset region and the first target number, and the preset number, making the determined target number more accurate, and thus also making the tab bending detection more accurate.

In some embodiments, the determining the target number based on the greatest value and the preset number includes: under a condition that the greatest value is less than or equal to the preset number, using the greatest value as the target number; or under a condition that the greatest value is greater than the preset number, traversing each fourth connected component among the damaged connected components and the undamaged connected component to calculate the number of tabs in each fourth connected component; adding the numbers of tabs in all fourth connected components together to obtain a second target number; and using the second target number as the target number. The greatest value is used as the target number, or the second target number obtained based on the fourth connected components is used as the target number, making the determined target number more reasonable and accurate.

In some embodiments, the calculating the number of tabs in each third connected component includes: determining sample points in each third connected component; in a preset horizontal direction, sorting, based on a position of each third connected component, the sample points in each third connected component to obtain a sorting result; and determining the number of tabs in each third connected component based on the sorting result and a preset threshold. The number of tabs in each third connected component is determined based on the sorting result and the preset threshold, making the determined number of tabs in each third connected component more accurate.

In some embodiments, the determining the number of tabs in each third connected component based on the sorting result and a preset threshold includes: determining, based on the sorting result, whether a distance between two adjacent sample points is greater than the preset threshold; if greater, determining the number of tabs on a vertical section between the two adjacent sample points; and determining the number of tabs in each third connected component based on the numbers of tabs on the vertical section between the two adjacent sample points. The distance between sample points is taken into full consideration, making the determined number of tabs in each third connected component more reasonable.

In some embodiments, the determining sample points in each third connected component includes: determining branchpoints, first-type endpoints, and second-type endpoints in each third connected component; removing burr points from the first-type endpoints and the second-type endpoints to obtain processed endpoints; and using the processed endpoints and the branchpoints as the sample points. The burr points are removed from the first-type endpoints and the second-type endpoints, which can make the determined endpoints more accurate and avoid inaccurate tab calculation caused by burrs.

An embodiment of a second aspect of this application provides a tab bending detection apparatus including:
  an extraction module, configured to perform skeleton extraction on a sectional image of multiple layers of tabs to obtain a skeleton image of the multiple layers of tabs;
  a merging module, configured to merge damaged connected components in the skeleton image to obtain a merged connected component, where the damaged connected components are multiple connected components in a same tab section;
  a calculating module, configured to calculate a target number of the multiple layers of tabs based on the merged connected component and an undamaged connected component; and
  a detection module, configured to detect, based on the target number and a preset number, whether any tab in the multiple layers of tabs is in a bending state.

In some embodiments, the merging module is specifically configured to: under a condition that an endpoint of a connected component is in a preset region of the skeleton image, determine, based on the endpoint, a first foreground point and a second foreground point that are adjacent to the endpoint, where the endpoint, the first foreground point, and the second foreground point are in different connected components; and merge the connected component in which the endpoint is located, a first connected component in which the first foreground point is located, and a second connected component in which the second foreground point is located to obtain the merged connected component.

In some embodiments, the merging module is specifically configured to: determine a first distance between the endpoint and the first foreground point and a second distance between the endpoint and the second foreground point; and under a condition that the first distance is less than the second distance, merge the first connected component in which the first foreground point is located and the connected component in which the endpoint is located to obtain the merged connected component; or under a condition that the second distance is less than the first distance, merge the second connected component in which the second foreground point is located and the connected component in which the endpoint is located to obtain the merged connected component.

In some embodiments, the calculating module is specifically configured to: traverse each third connected components of the merged connected component and the undamaged connected component to calculate the number of tabs in each third connected component; add the numbers of tabs in all third connected components together to obtain a first target number; and determine the target number of the multiple layers of tabs based on the first target number and the numbers of endpoints in a preset region of the merged connected component and the undamaged connected component.

In some embodiments, the calculating module is specifically configured to: under a condition that the numbers of endpoints in a preset region are the same as the preset number, use the number of endpoints in a preset region as the target number; or under a condition that the numbers of endpoints in a preset region are different from the preset number, determine the greatest value of the numbers of endpoints in a preset region and the first target number; and determine the target number based on the greatest value and the preset number.

In some embodiments, the calculating module is specifically configured to: under a condition that the greatest value is less than or equal to the preset number, use the greatest value as the target number; or under a condition that the greatest value is greater than the preset number, traverse each fourth connected component among the damaged connected components and the undamaged connected component to calculate the number of tabs in each fourth connected component; add the numbers of tabs in all fourth connected components together to obtain a second target number; and use the second target number as the target number.

In some embodiments, the calculating module is specifically configured to: determine sample points in each third connected component; in a preset horizontal direction, sort, based on a position of each third connected component, the sample points in each third connected component to obtain a sorting result; and determine the number of tabs in each third connected component based on the sorting result and a preset threshold.

In some embodiments, the calculating module is specifically configured to: determine, based on the sorting result, whether a distance between two adjacent sample points is greater than the preset threshold; if greater, determine the numbers of tabs on a vertical section between the two adjacent sample points; and determine the number of tabs in each third connected component based on the numbers of tabs on the vertical section between the two adjacent sample points.

In some embodiments, the calculating module is specifically configured to: determine branchpoints, first-type endpoints, and second-type endpoints in each third connected component; remove burr points from the first-type endpoints and the second-type endpoints to obtain processed endpoints; and use the processed endpoints and the branchpoints as the sample points.

An embodiment of a third aspect of this application provides an electronic device including a memory and a processor, where the memory stores a computer program executable by the processor, and when the computer program is executed by the processor, the method according to any one of the embodiments of the first aspect is implemented.

An embodiment of a fourth aspect of this application provides a computer-readable storage medium, where the storage medium stores a computer program, and when the computer program is read and executed, the method according to any one of the embodiments of the first aspect is implemented.

An embodiment of a fifth aspect of this application provides a computer program product, where the computer program product includes a computer program, and when executed by a processor, the computer program is used to implement the method according to any one of the embodiments of the first aspect.

The foregoing description is merely an overview of the technical solution of this application. For a better understanding of the technical means in this application such that they can be implemented according to the content of the specification, and to make the above and other objectives, features and advantages of this application more obvious and easier to understand, the following describes specific embodiments of this application.

BRIEF DESCRIPTION OF DRAWINGS

In the accompanying drawings, unless otherwise specified, the same reference signs in a plurality of accompanying drawings denote the same or similar components or elements. The accompanying drawings are not necessarily drawn to scale. It should be understood that these accompanying drawings merely describe some embodiments disclosed in this application, and should not be construed as a limitation on the scope of this application.

DETAILED DESCRIPTION

Figure 1:
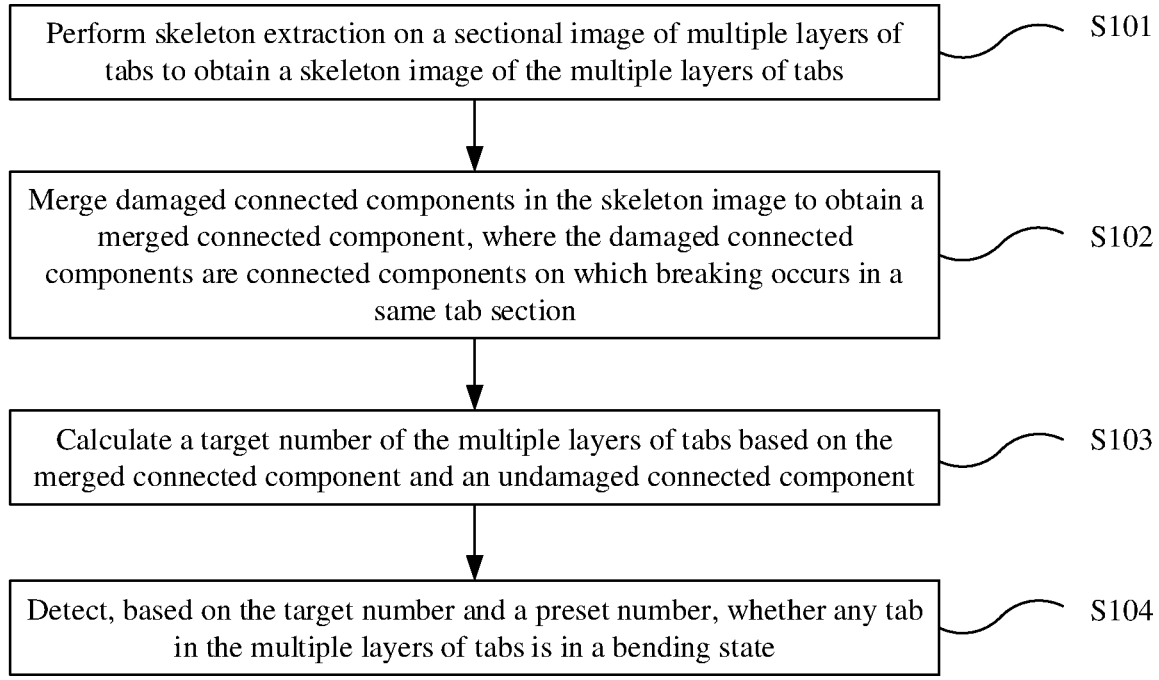
FIG. 1 is a schematic flowchart of a tab bending detection method according to an embodiment of this application.

The following describes in detail the embodiments of technical solutions in this application with reference to the accompanying drawings. The following embodiments are merely used to describe technical solutions in this application more explicitly, and therefore they are merely used as examples and do not constitute a limitation to the protection scope of this application.

Unless otherwise defined, all technical and scientific terms used herein shall have the same meanings as commonly understood by those skilled in the art to which this application belongs. The terms used herein are merely intended to describe the specific embodiments but not intended to constitute any limitation on this application. The terms "include", and "have" and any other variations thereof in the specification, the claims and the foregoing brief description of drawings of this application are intended to cover a non-exclusive inclusion.

In the description of the embodiments of this application, the terms "first", "second" and the like are merely intended to distinguish between different objects, and shall not be understood as any indication or implication of relative importance or any implicit indication of the number, specific sequence or primary-secondary relationship of the technical features indicated. In the description of the embodiments of this application, "a plurality of" means at least two unless otherwise specifically stated.

The term "embodiment" described herein means that specific features, structures, or characteristics described with reference to the embodiment may be incorporated in at least one embodiment of this application. The term "embodiment" appearing in various places in the specification does not necessarily refer to the same embodiment or an independent or alternative embodiment that is exclusive of other embodiments. It is explicitly or implicitly understood by persons skilled in the art that the embodiments described herein may be combined with other embodiments.

In the description of the embodiments of this application, the term "and/or" is only an association relationship for describing associated objects, indicating that three relationships may exist. For example, A and/or B may indicate the following three cases: A alone, both A and B, and B alone.

In addition, a character "/" in this specification generally indicates an "or" relationship between contextually associated objects.

In the description of the embodiments of this application, the term "a plurality of" means more than two (inclusive). Similarly, "a plurality of groups" means more than two (inclusive) groups, and "a plurality of pieces" means more than two (inclusive) pieces.

In the description of the embodiments of this application, the orientations or positional relationships indicated by the terms "center", "longitudinal", "transverse", "length", "width", "thickness", "upper", "lower", "front", "rear", "left", "right", "vertical", "horizontal", "top", "bottom", "inside", "outside", "clockwise", "counterclockwise", "axial", "radial", "circumferential", and the like are based on the orientations or positional relationships shown in the accompanying drawings, and merely intended to facilitate the descriptions of this application and simplify the descriptions rather than to indicate or imply that the apparatuses or components mentioned must have specific orientations, or be constructed and operated for a specific orientation, and therefore shall not be construed as a limitation to this application.

In the description of the embodiments of this application, unless otherwise specified and defined explicitly, the terms "mount", "connect", "join", and "fasten" should be understood in their general senses. For example, they may refer to a fixed connection, a detachable connection, or an integral connection, may refer to a mechanical connection or electrical connection, any may refer to a direct connection, an indirect connection via an intermediate medium, or an interaction between two elements. Persons of ordinary skill in the art can understand specific meanings of these terms in the embodiments of this application as appropriate to specific situations.

With rapid development of new energy vehicles, traction batteries have been widely used. A bare cell in a traction battery may be manufactured through winding, and only a part of an electrode plate wound of the cell is retained as metal foil to allow current to pass through, and this part of metal foil is a tab. The metal foil is extremely thin so that the tab is prone to bending during winding, and therefore tab bending detection has become a hot research topic.

In the related art, during tab bending detection, a line diagram corresponding to a tab region is obtained, the number of lines on a vertical section of an image corresponding to each sample point is calculated, and the maximum number of lines is taken as the actual number of tabs.

However, in the related art, the number of lines on the vertical section of the image corresponding to each sample point is separately calculated, making no connection in calculation. Consequently, it is likely that the calculated number of tabs is inaccurate, leading to inaccurate tab bending detection.

To resolve at least one of the foregoing problems, the embodiments of this application provide a tab bending detection method: merging damaged connected components to obtain a merged connected component Based on the merged connected component and an undamaged connected component, for the target number of the multiple layers of tabs calculated based on these connected components, association between the multiple layers of tabs can be taken into full consideration, making the calculated target number more accurate, and thus making the tab bending detection more accurate.

According to the tab bending detection method disclosed in the embodiments of this application, a sectional image of a side of multiple tabs may be collected by using an image capture device, and the image capture device may be disposed on the side of the multiple layers of tabs. The image capture device is communicatively connected to an electronic device, the image capture device may send the sectional image of the multiple layers of tabs to the electronic device, and the electronic device may receive the sectional image of the multiple layers of tabs and perform the tab bending detection method provided in the embodiments of this application, so as to determine whether any tab in the multiple layers of tabs is in a bending state.

The communication connection may be wired communication connection or wireless communication connection.

It should be noted that the image capture device may be a camera or another device with an image capture function. This is not specifically limited in the embodiments of this application. The electronic device may be a terminal or a server, and the terminal may be any one of the following: a desktop computer, a notebook computer, a tablet computer, a smartphone, and the like.

According to some embodiments of this application, FIG. 1 is a schematic flowchart of a tab bending detection method according to an embodiment of this application. As shown in FIG. 1, the tab bending detection method may include the following steps.

S101. Perform skeleton extraction on a sectional image of multiple layers of tabs to obtain a skeleton image of the multiple layers of tabs.

S102. Merge damaged connected components in the skeleton image to obtain a merged connected component, where the damaged connected components are connected components on which breaking occurs in a same tab section.

S103. Calculate a target number of the multiple layers of tabs based on the merged connected component and an undamaged connected component.

S104. Detect, based on the target number and a preset number, whether any tab in the multiple layers of tabs is in a bending state.

The sectional image of the multiple layers of tabs may be a segmented image of a sectional region of the multiple layers of tabs.

In some embodiments, the sectional image of the multiple layers of tabs is preprocessed to obtain a preprocessed image; and skeleton extraction is performed on the preprocessed image to obtain the skeleton image of the multiple layers of tabs. The skeleton image is a single-pixel width skeleton image.

Optionally, the process of the sectional image of the multiple layers of tabs being preprocessed may include: binarizing the sectional image of the multiple layers of tabs to obtain a binarized image; detecting a hole in the binarized image; and under a condition that a size of the hole satisfies a preset condition, filling the hole.

It should be noted that background pixels and foreground pixels in the binarized image have different pixel values. For example, a background pixel may have a pixel value of 0, and a foreground pixel may have a pixel value of 1.

In addition, the damaged connected components in the skeleton image may be determined and then merged to obtain the merged connected component, and the target number of the multiple layers of tabs is calculated based on the merged connected component and the undamaged connected component. For example, a sum value of all connected components may be used as the target number of the multiple layers of tabs.

In this embodiment of this application, if the target number is less than the preset number, it is determined that a tab in the multiple layers of tabs is in the bending state; and if the target number is less than the preset number, it is determined that no tab in the multiple layers of tabs is in the bending state.

The damaged connected components are merged to obtain the merged connected component. The target number of the multiple layers of tabs calculated based on the merged connected component and the undamaged connected component is more accurate, thus making the tab bending detection more accurate.

Figure 2:
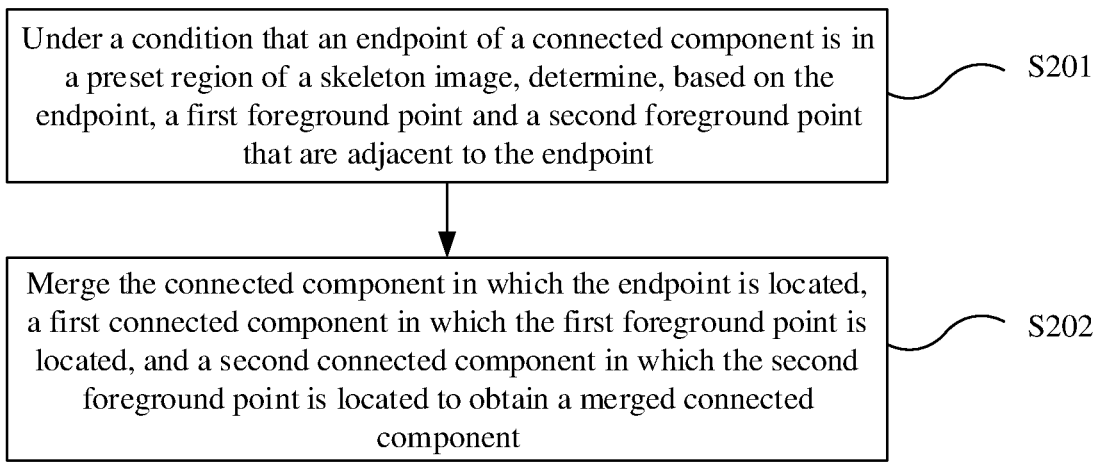
FIG. 2 is a schematic flowchart of a tab bending detection method according to an embodiment of this application.

According to some embodiments of this application, FIG. 2 is a schematic flowchart of a tab bending detection method according to an embodiment of this application. As shown in FIG. 2, the process of merging damaged connected components in the skeleton image to obtain a merged connected component in S102 includes the following steps.

S201. Under a condition that an endpoint of a connected component is in a preset region of the skeleton image, determine, based on the endpoint, a first foreground point and a second foreground point that are adjacent to the endpoint.

S202. Merge the connected component in which the endpoint is located, a first connected component in which the first foreground point is located, and a second connected component in which the second foreground point is located to obtain the merged connected component.

It should be noted that, under the condition that the endpoint of the connected component is in the preset region of the skeleton image, it is determined that the connected component may be a suspected damaged connected component. The endpoint is determined as a breaking point A, a vertical section of the endpoint is determined, and the first foreground point and the second foreground point are determined based on connected components on the vertical section. The first foreground point may be referred to as an uppermost foreground point A1, and the second foreground point A2 may be referred to as a lowermost foreground point.

It should be noted that, under a condition that the damaged connected component has only one branch, the first foreground point, the second foreground point, and the breaking point are the same point, and both the first foreground point and the second foreground point are the breaking point A.

In this embodiment of this application, a to-be-merged connected component may be determined from the first connected component in which the first foreground point is located and the second connected component in which the second foreground point is located, and the connected component in which the endpoint is located and the to-be-merged connected component are merged to obtain the merged connected component.

Under the condition that the endpoint of the connected component is in the preset region of the skeleton image, merging is performed based on the endpoint and the first foreground point and the second foreground point that are adjacent to the endpoint, making the merging result more reasonable and accurate.

Figure 3:
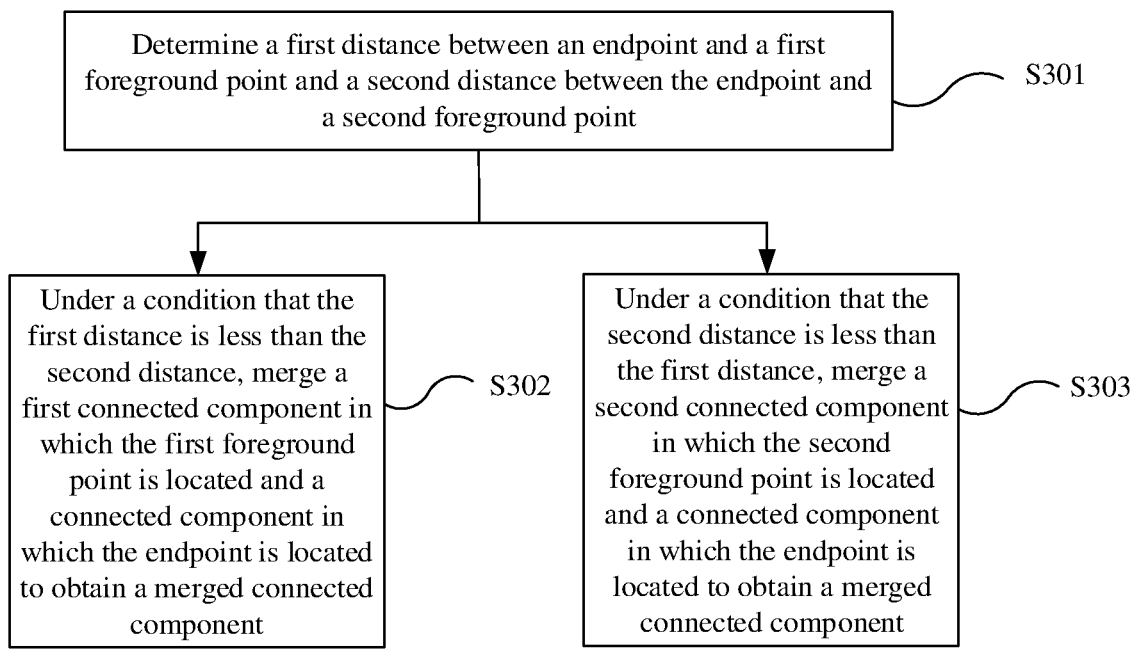
FIG. 3 is a schematic flowchart of a tab bending detection method according to an embodiment of this application.

According to some embodiments of this application, FIG. 3 is a schematic flowchart of a tab bending detection method according to an embodiment of this application. As shown in FIG. 3, the process of merging the connected component in which the endpoint is located, a first connected component in which the first foreground point is located, and a second connected component in which the second foreground point is located to obtain the merged connected component in S202 may include the following steps.

S301. Determine a first distance between the endpoint and the first foreground point and a second distance between the endpoint and the second foreground point.

S302. Under a condition that the first distance is less than the second distance, merge the first connected component in which the first foreground point is located and the connected component in which the endpoint is located to obtain the merged connected component.

S303. Under a condition that the second distance is less than the first distance, merge the second connected component in which the second foreground point is located and the connected component in which the endpoint is located to obtain the merged connected component.

The first foreground point is the uppermost foreground point closest to the endpoint, and the second foreground point is the lowermost foreground point closest to the endpoint. The first connected component in which the first foreground point is located may be an upper adjacent connected component, and the second connected component in which the second foreground point is located may be a lower adjacent connected component.

In this embodiment of this application, the connected component in which the endpoint is located and the first connected component in which the first foreground point is located or the second connected component in which the second foreground point is located may be merged to obtain the merged connected component. In addition, separate connected components before merging need to be deleted. Under a condition that the first connected component and the connected component in which the endpoint is located are merged, the separate first connected component and connected component in which the endpoint is located are deleted, and the second connected component is reserved; or under a condition that the second connected component and the connected component in which the endpoint is located are merged, the separate second connected component and connected component in which the endpoint is located are deleted, and the first connected component is reserved.

Figure 4:
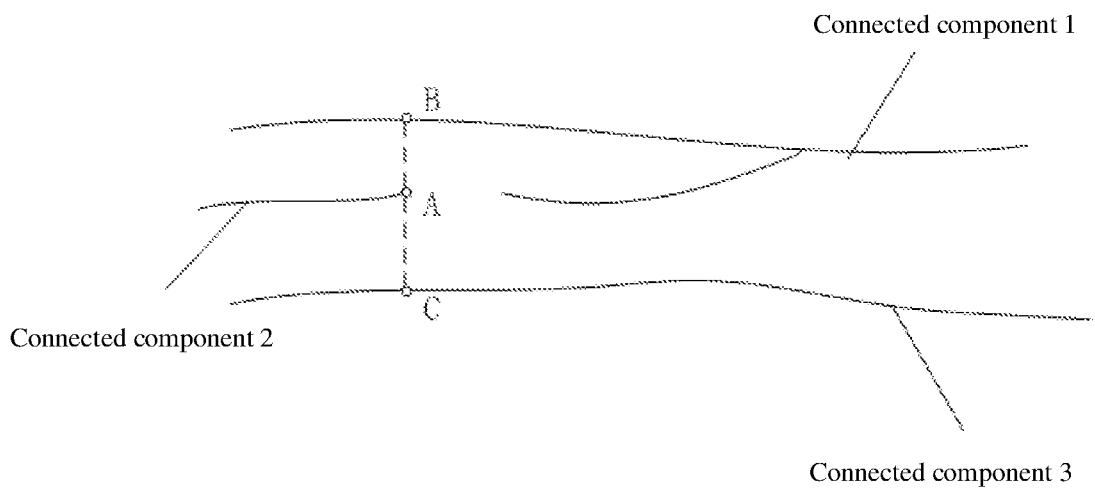
FIG. 4 is a schematic flowchart of a tab bending detection method according to an embodiment of this application.

FIG. 4 is a schematic flowchart of a tab bending detection method according to an embodiment of this application. As shown in FIG. 4, an endpoint A in a connected component 2 is in a preset region of a skeleton image, so it is considered that the connected component 2 is a suspected damaged connected component. An upper foreground point B of the remaining connected components closest to the endpoint A and a lower foreground point C of the remaining connected components closest to the endpoint A are determined, so as to find an upper adjacent connected component 1 and a lower adjacent connected component 3. The upper adjacent connected component 1 is closest to the connected component 2, so the damaged connected component 1 and the damaged connected component 2 are merged, and the original separate damaged connected component 1 and damaged connected component 2 are deleted.

Calculation is performed on the merged connected component according to the foregoing multi-section calculating method for connected component sample points, giving a tab calculation result of three, which is correct. However, if calculation is separately performed on the three separate connected components, four tabs are detected, with one extra tab being detected.

Figure 5:
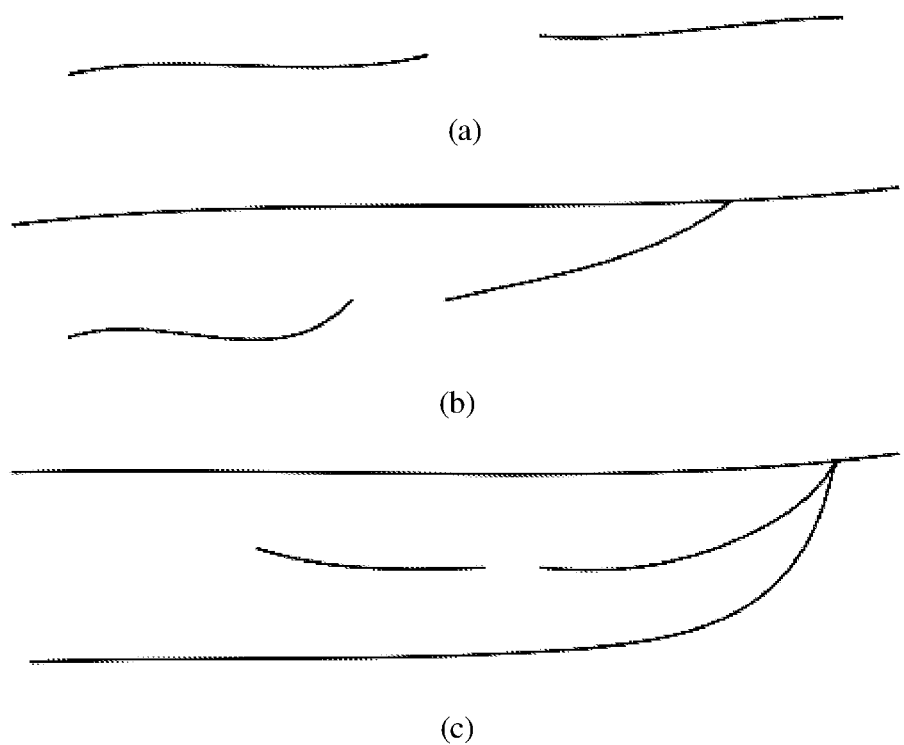
FIG. 5 is a schematic diagram of breaking of a connected component of a tab according to an embodiment of this application.

In addition, FIG. 5 is a schematic diagram of breaking of a connected component of a tab according to an embodiment of this application. As shown in FIG. 5, (a), (b), and (c) in FIG. 5 show three different breaking cases of the connected component of the tab.

The first connected component and the second connected component that need to be merged with the connected component in which the endpoint is located can be accurately determined based on the first distance between the endpoint and the first foreground point and the second distance between the endpoint and the second foreground point, so as to implement accurate merging of connected components.

Figure 6:
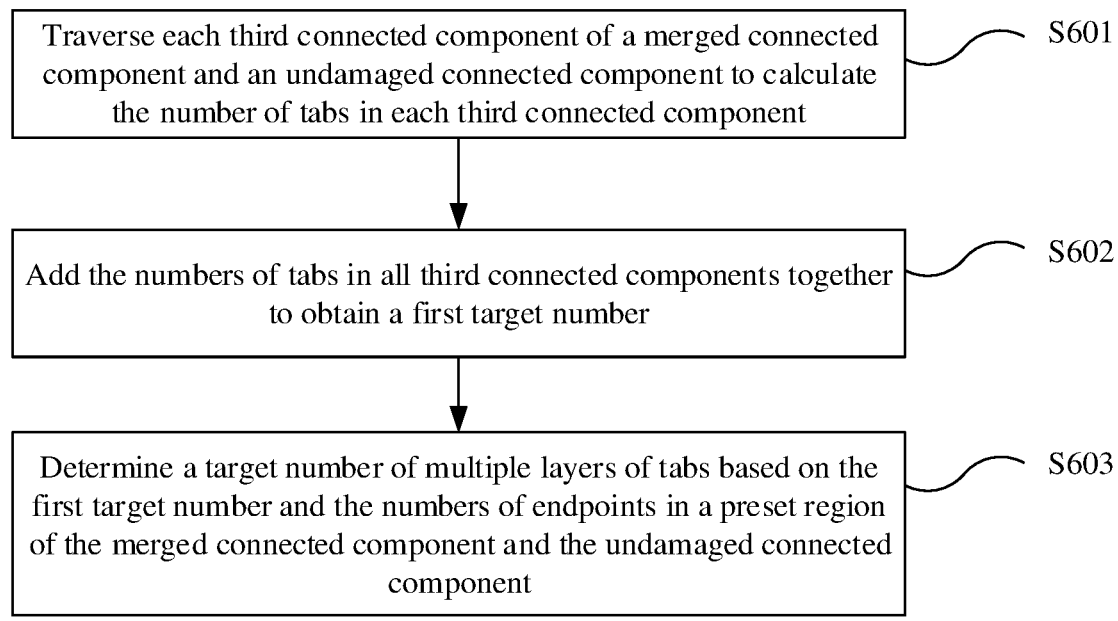
FIG. 6 is a schematic flowchart of a tab bending detection method according to an embodiment of this application.

According to some embodiments of this application, FIG. 6 is a schematic flowchart of a tab bending detection method according to an embodiment of this application. As shown in FIG. 6, the process of calculating a target number of the multiple layers of tabs based on the merged connected component and an undamaged connected component in S103 may include the following steps.

S601. Traverse each third connected component of the merged connected component and the undamaged connected component to calculate the number of tabs in each third connected component.

S602. Add the numbers of tabs in all third connected components together to obtain a first target number.

S603. Determine the target number of the multiple layers of tabs based on the first target number and the numbers of endpoints in a preset region of the merged connected component and the undamaged connected component.

The third connected component may be any one of the merged connected component and the undamaged connected component. The number of tabs in each third connected component may be calculated separately, and the numbers of tabs in all third connected components are added to obtain the first target number.

It should be noted that the preset region may be a left region, the number of endpoints in a preset region may be the number of left endpoints within the range of the left region, the number of endpoints in a preset region may be b, and the first target number may be a.

By making full use of skeleton endpoint information, a policy for distinguishing between left endpoints and right endpoints is designed based on the characteristic that a skeleton image of a tab section extends along a horizontal direction. In addition, because the leftmost skeleton endpoint of each connected component is generally located at the root of a tab, an image of such left region is generally clear. Therefore, the number of left endpoints in a specified region on the left of the image can correctly reflect an actual number of tabs in the image in most cases.

For example, a target point P1 and its 8 neighboring pixels are defined as follows.

| P9 | P2 | P3 |
| P8 | P1 | P4 |
| P7 | P6 | P5 |

Left endpoints: pixels P2 P9, P8, P7, and P6 all have a pixel value of 0, that is, these pixels are background pixels. Among pixels P3, P4, and P5, only one pixel has a value of 1, and both the other two pixels are background pixels. Right endpoints: pixels P2, P3, P4, P5, and P6 all have a pixel value of 0, that is, these pixels are background pixels. Among pixels P9, P8, and P7, only one pixel has a value of 1, and both the other two pixels are background pixels.

The first target number is obtained through calculation based on the merged connected component and the undamaged connected component, and the target number is determined based on the first target number in combination with the numbers of endpoints in a preset region of the merged connected component and the undamaged connected component, making the determined target number more accurate.

Figure 7:
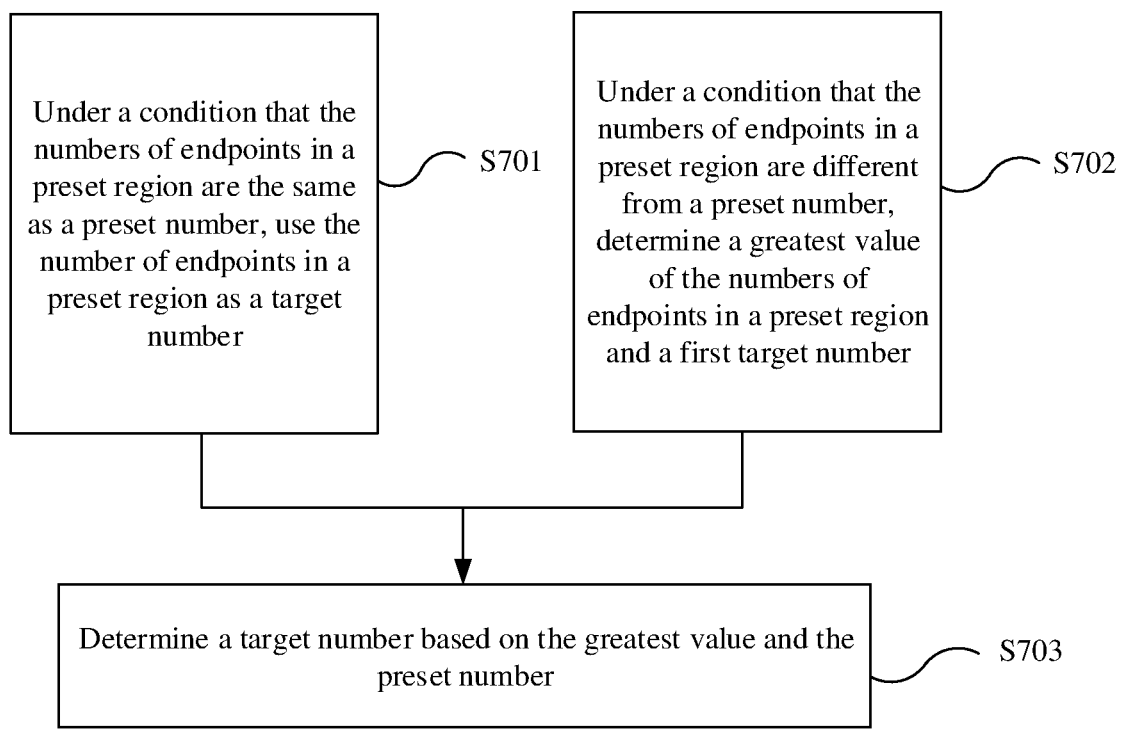
FIG. 7 is a schematic flowchart of a tab bending detection method according to an embodiment of this application.

According to some embodiments of this application, FIG. 7 is a schematic flowchart of a tab bending detection method according to an embodiment of this application. As shown in FIG. 7, the process of determining the target number of the multiple layers of tabs based on the first target number and the numbers of endpoints in a preset region of the merged connected component and the undamaged connected component in S603 may include the following steps.

S701. Under a condition that the numbers of endpoints in a preset region are the same as the preset number, use the number of endpoints in a preset region as the target number.

S702. Under a condition that the numbers of endpoints in a preset region are different from the preset number, determine the greatest value of the numbers of endpoints in a preset region and the first target number.

S703. Determine the target number based on the greatest value and the preset number.

In the case that the numbers of endpoints in a preset region are different from the preset number, if the numbers of endpoints in a preset region are greater than the first target number, the greatest value is the number of endpoints in a preset region; or if the numbers of endpoints in a preset region are less than the first target number, the greatest value is the first target number.

The target number may be referred to as checkNum. If the number b of endpoints in a preset region is equal to the preset number normalNum, checkNum is equal to b. If the number b of endpoints in a preset region is not equal to the preset number normalNum, the greater value of the number b of endpoints in a preset region and the first target number a is determined, and this process is expressed as max(a,b).

The target number is determined based on the greatest value of the numbers of endpoints in a preset region and the first target number, and the preset number, making the determined target number more accurate, and thus also making the tab bending detection more accurate.

Figure 8:
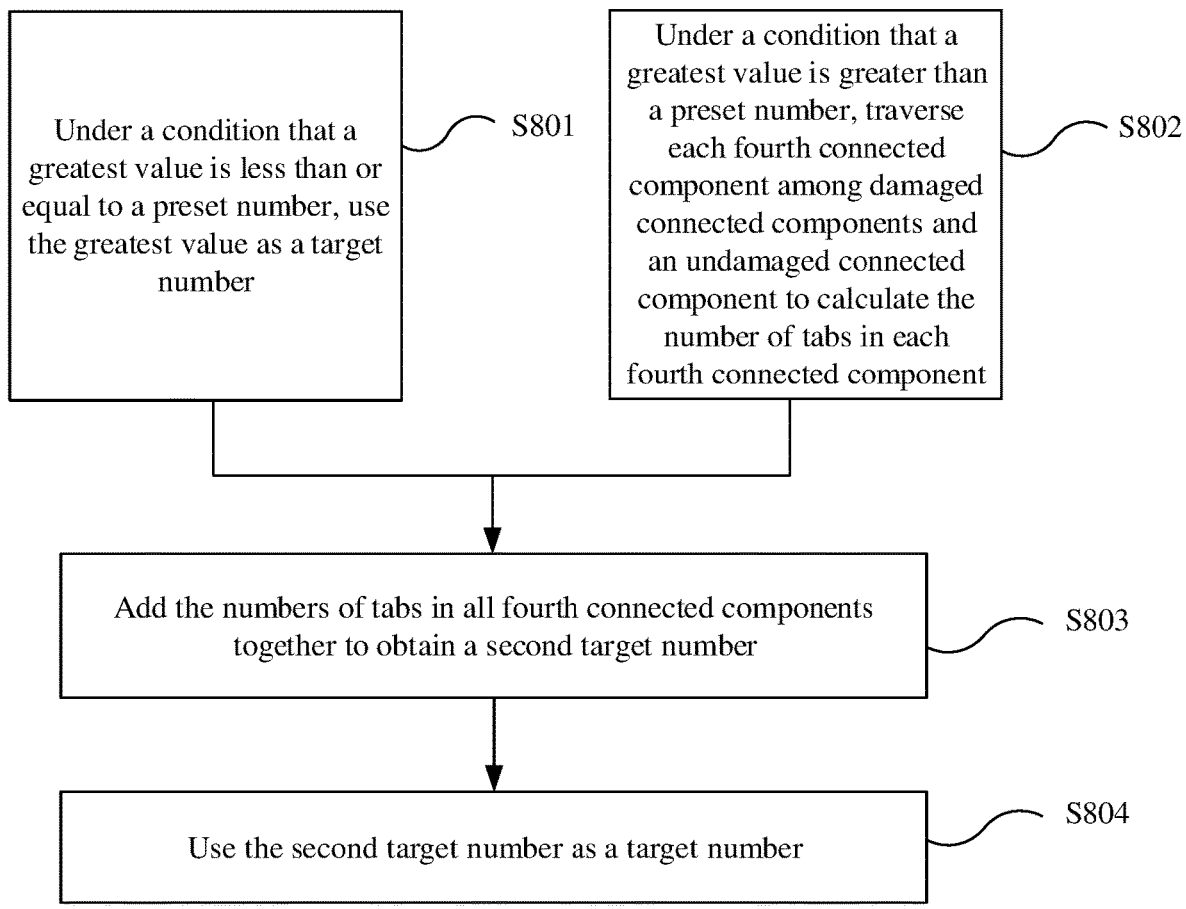
FIG. 8 is a schematic flowchart of a tab bending detection method according to an embodiment of this application.

According to some embodiments of this application, FIG. 8 is a schematic flowchart of a tab bending detection method according to an embodiment of this application. As shown in FIG. 8, the process of determining the target number based on the greatest value and the preset number in S703 may include the following steps.

S801. Under a condition that the greatest value is less than or equal to the preset number, use the greatest value as the target number.

S802. Under a condition that the greatest value is greater than the preset number, traverse each fourth connected component among the damaged connected components and the undamaged connected component to calculate the number of tabs in each fourth connected component.

S803. Add the numbers of tabs in all fourth connected components together to obtain a second target number.

S804. Use the second target number as the target number.

If the greatest value max(a,b) of the numbers of endpoints in a preset region and the first target number is less than or equal to the preset number normalNum, the target number checkNum is equal to the greatest value max(a,b); or if max(a,b) is greater than the preset number normalNum, the target number checkNum is equal to the second target number c.

In addition, the fourth connected component may be any one of the damaged connected components and the undamaged connected component. The numbers of tabs in all fourth connected components are determined in sequence or simultaneously, and added together to obtain the second target number c.

The greatest value is used as the target number, or the second target number obtained based on the fourth connected components is used as the target number, making the determined target number more reasonable and accurate.

Figure 9:
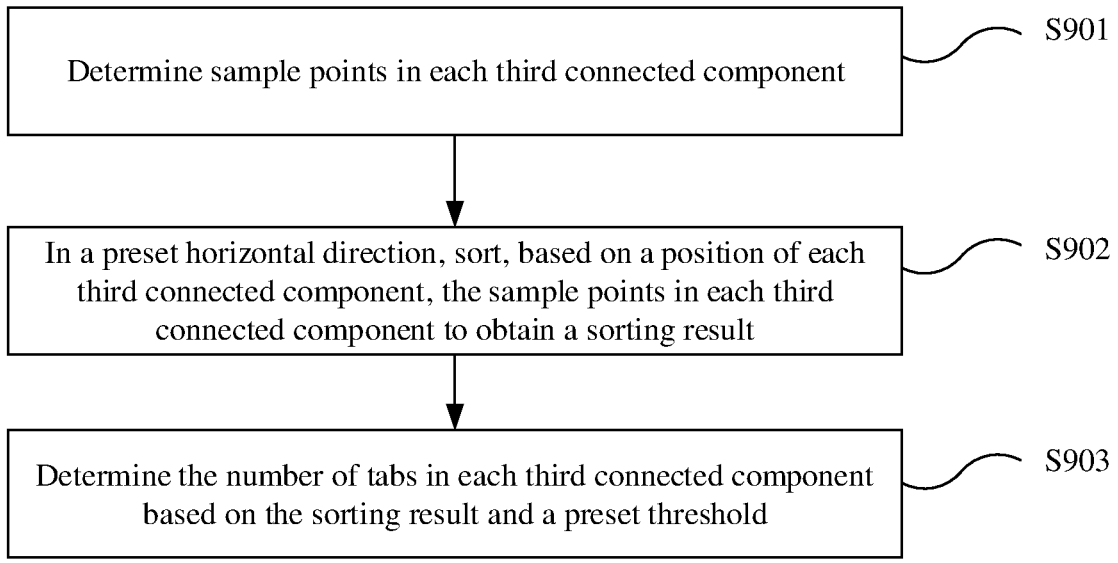
FIG. 9 is a schematic flowchart of a tab bending detection method according to an embodiment of this application.

According to some embodiments of this application, FIG. 9 is a schematic flowchart of a tab bending detection method according to an embodiment of this application. As shown in FIG. 9, the process of calculating the number of tabs in each third connected component in S601 may include the following steps.

S901. Determine sample points in each third connected component.

S902. In a preset horizontal direction, sort, based on a position of each third connected component, the sample points in each third connected component to obtain a sorting result.

S903. Determine the number of tabs in each third connected component based on the sorting result and a preset threshold.

The preset horizontal direction may be an axis X direction in a coordinate axis.

In some embodiments, in the axis X direction, for each third connected component, sorting is performed by coordinate values of the sample points in each third connected component to obtain the sorting result. The sorting may be performed in ascending order or in descending order. This is not specifically limited in the embodiments of this application.

In addition, the preset threshold may be an empirical value or may be set based on actual requirements. This is not specifically limited in the embodiments of this application either.

The number of tabs in each third connected component is determined based on the sorting result and the preset threshold, making the determined number of tabs in each third connected component more accurate.

Figure 10:
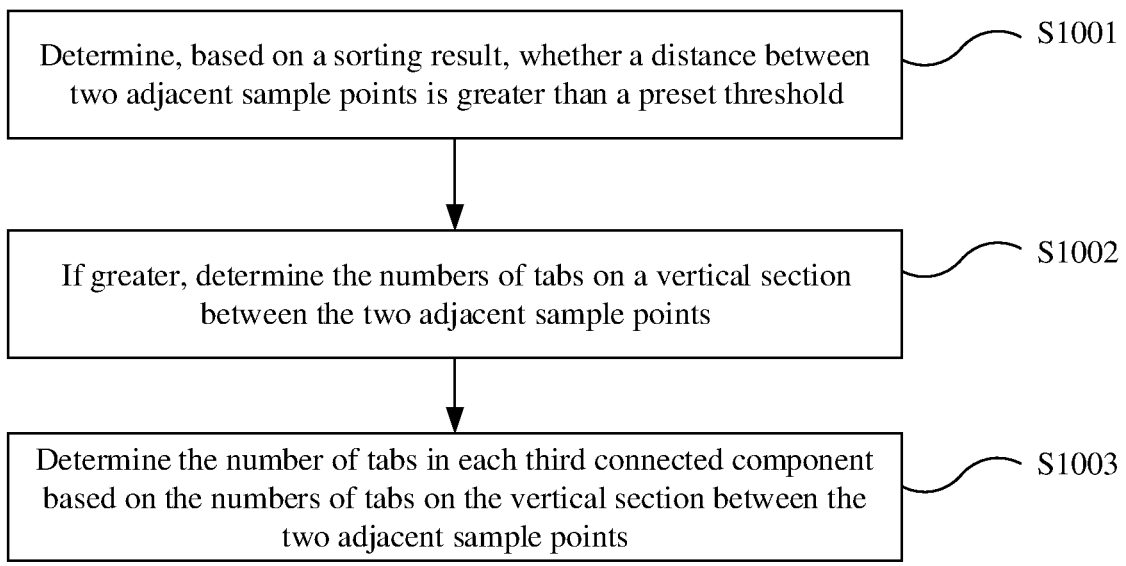
FIG. 10 is a schematic flowchart of a tab bending detection method according to an embodiment of this application.

According to some embodiments of this application, FIG. 10 is a schematic flowchart of a tab bending detection method according to an embodiment of this application. As shown in FIG. 10, the process of determining, based on the sorting result and a preset threshold, the number of tabs in each third connected component in S903 may include the following steps.

S1001. Determine, based on the sorting result, whether a distance between two adjacent sample points is greater than the preset threshold.

S1002. If greater, determine the numbers of tabs on a vertical section between the two adjacent sample points.

S1003. Determine the number of tabs in each third connected component based on the numbers of tabs on the vertical section between the two adjacent sample points.

In this embodiment of this application, if the distance between the two adjacent sample points is greater than the preset threshold, the numbers of tabs on the vertical section between the two adjacent sample points are determined; and a greater number of the numbers of tabs on the vertical section between the two adjacent sample points is used as the number of tabs in each third connected component.

The number of tabs in each third connected component is determined based on the numbers of tabs on the vertical section between the two adjacent sample points, taking into full consideration the distance between sample points, and thus making the determined number of tabs in each third connected component more reasonable.

Figure 11:
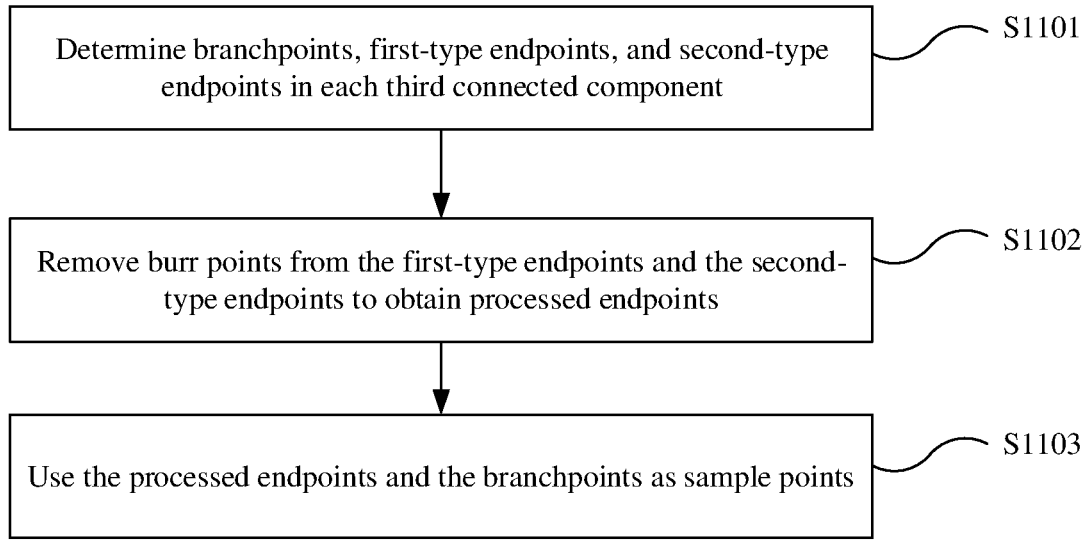
FIG. 11 is a schematic flowchart of a tab bending detection method according to an embodiment of this application.

According to some embodiments of this application, FIG. 11 is a schematic flowchart of a tab bending detection method according to an embodiment of this application. As shown in FIG. 11, the process of determining sample points in each third connected component in S901 may include the following steps.

S1101. Determine branchpoints, first-type endpoints, and second-type endpoints in each third connected component.

S1102. Remove burr points from the first-type endpoints and the second-type endpoints to obtain processed endpoints.

S1103. Use the processed endpoints and the branchpoints as the sample points.

The first-type endpoints may be left endpoints, and the second-type endpoints may be right endpoints.

In some embodiments, the branchpoints and endpoints in each connected component are extracted, the endpoints are classified into left endpoints and right endpoints, and burrs of the skeleton are removed, that is, burr points are removed from the first-type endpoints and the second-type endpoints to obtain the processed endpoints. The sample points may include the processed endpoints and the branchpoints.

The burr points are removed from the first-type endpoints and the second-type endpoints, which can make the determined endpoints more accurate and avoid inaccurate tab calculation caused by burrs.

A schematic flowchart of a tab bending detection method according to an embodiment of this application may include the following steps.

S1001. Perform skeleton extraction on a sectional image of multiple layers of tabs to obtain a skeleton image of the multiple layers of tabs.

S1002. Under a condition that an endpoint of a connected component is in a preset region of the skeleton image, determine, based on the endpoint, a first foreground point and a second foreground point that are adjacent to the endpoint, where the endpoint, the first foreground point, and the second foreground point are in different connected components.

S1003. Determine a first distance between the endpoint and the first foreground point and a second distance between the endpoint and the second foreground point.

S1004. Under a condition that the first distance is less than the second distance, merge the first connected component in which the first foreground point is located and the connected component in which the endpoint is located to obtain the merged connected component.

S1005. Under a condition that the second distance is less than the first distance, merge the second connected component in which the second foreground point is located and the connected component in which the endpoint is located to obtain the merged connected component.

S1006. Traverse each third connected component of the merged connected component and an undamaged connected component to determine branchpoints, first-type endpoints, and second-type endpoints in each third connected component.

S1007. Remove burr points from the first-type endpoints and the second-type endpoints to obtain processed endpoints.

S1008. Use the processed endpoints and the branchpoints as the sample points.

S1009. In a preset horizontal direction, sort, based on a position of each third connected component, the sample points in each third connected component to obtain a sorting result.

S1010. Determine, based on the sorting result, whether a distance between two adjacent sample points is greater than a preset threshold.

S1011. If greater, determine the numbers of tabs on a vertical section between the two adjacent sample points.

S1012. Determine the number of tabs in each third connected component based on the numbers of tabs on the vertical section between the two adjacent sample points.

S1013. Add the numbers of tabs in all third connected components together to obtain a first target number.

S1014. Under a condition that the number of endpoints in a preset region is the same as the preset number, use the number of endpoints in a preset region as the target number.

S1015. Under a condition that the number of endpoints in a preset region is different from the preset number, determine the greater value of the number of endpoints in a preset region and the first target number.

S1016. Under a condition that the greater value is less than or equal to the preset number, use the greater value as the target number.

S1017. Under a condition that the greater value is greater than the preset number, traverse each fourth connected component among damaged connected components and the undamaged connected component to calculate the number of tabs in each fourth connected component.

S1018. Add the numbers of tabs in all fourth connected components together to obtain a second target number.

S1019. Use the second target number as the target number.

Figure 12:
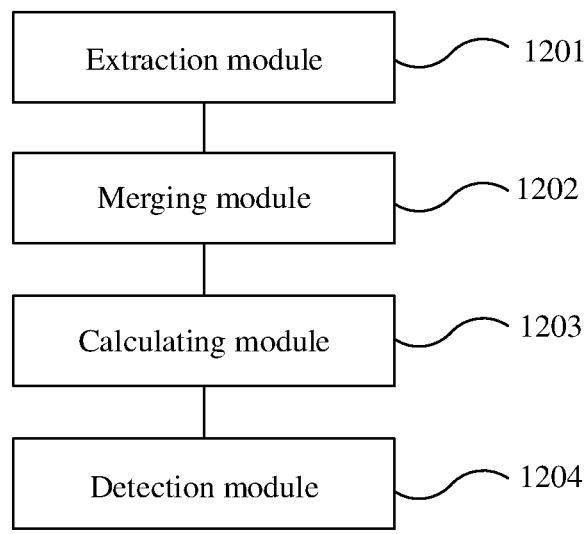
FIG. 12 is a schematic structural diagram of a tab bending detection apparatus according to an embodiment of this application.

FIG. 12 is a schematic structural diagram of a tab bending detection apparatus according to an embodiment of this application. As shown in FIG. 12, the apparatus may include:

an extraction module 1201, configured to perform skeleton extraction on a sectional image of multiple layers of tabs to obtain a skeleton image of the multiple layers of tabs;

a merging module 1202, configured to merge damaged connected components in the skeleton image to obtain a merged connected component, where the damaged connected components are connected components on which breaking occurs in a same tab section;

a calculating module 1203, configured to calculate a target number of the multiple layers of tabs based on the merged connected component and an undamaged connected component; and a detection module 1204, configured to detect, based on the target number and a preset number, whether any tab in the multiple layers of tabs is in a bending state.

In some embodiments, the merging module 1202 is specifically configured to: under a condition that an endpoint of a connected component is in a preset region of the skeleton image, determine, based on the endpoint, a first foreground point and a second foreground point that are adjacent to the endpoint, where the endpoint, the first foreground point, and the second foreground point are in different connected components; and merge the connected component in which the endpoint is located, a first connected component in which the first foreground point is located, and a second connected component in which the second foreground point is located to obtain the merged connected component.

In some embodiments, the merging module 1202 is specifically configured to: determine a first distance between the endpoint and the first foreground point and a second distance between the endpoint and the second foreground point; and under a condition that the first distance is less than the second distance, merge the first connected component in which the first foreground point is located and the connected component in which the endpoint is located to obtain the merged connected component; or under a condition that the second distance is less than the first distance, merge the second connected component in which the second foreground point is located and the connected component in which the endpoint is located to obtain the merged connected component.

In some embodiments, the calculating module 1203 is specifically configured to: traverse each third connected components of the merged connected component and the undamaged connected component to calculate the number of tabs in each third connected component; add the numbers of tabs in all third connected components together to obtain a first target number; and determine the target number of the multiple layers of tabs based on the first target number and the numbers of endpoints in a preset region of the merged connected component and the undamaged connected component.

In some embodiments, the calculating module 1203 is specifically configured to: under a condition that the numbers of endpoints in a preset region are the same as the preset number, use the number of endpoints in a preset region as the target number; or under a condition that the numbers of endpoints in a preset region are different from the preset number, determine the greatest value of the numbers of endpoints in a preset region and the first target number; and determine the target number based on the greatest value and the preset number.

In some embodiments, the calculating module 1203 is specifically configured to: under a condition that the greatest value is less than or equal to the preset number, use the greatest value as the target number; or under a condition that the greatest value is greater than the preset number, traverse each fourth connected component among the damaged connected components and the undamaged connected component to calculate the number of tabs in each fourth connected component; add the numbers of tabs in all fourth connected components together to obtain a second target number; and use the second target number as the target number.

In some embodiments, the calculating module 1203 is specifically configured to: determine sample points in each third connected component; in a preset horizontal direction, sort, based on a position of each third connected component, the sample points in each third connected component to obtain a sorting result; and determine the number of tabs in each third connected component based on the sorting result and a preset threshold.

In some embodiments, the calculating module 1203 is specifically configured to: determine, based on the sorting result, whether a distance between two adjacent sample points is greater than the preset threshold; if greater, determine the numbers of tabs on a vertical section between the two adjacent sample points; and determine the number of tabs in each third connected component based on the numbers of tabs on the vertical section between the two adjacent sample points.

In some embodiments, the calculating module 1203 is specifically configured to: determine branchpoints, first-type endpoints, and second-type endpoints in each third connected component; remove burr points from the first-type endpoints and the second-type endpoints to obtain processed endpoints; and use the processed endpoints and the branchpoints as the sample points.

Figure 13:
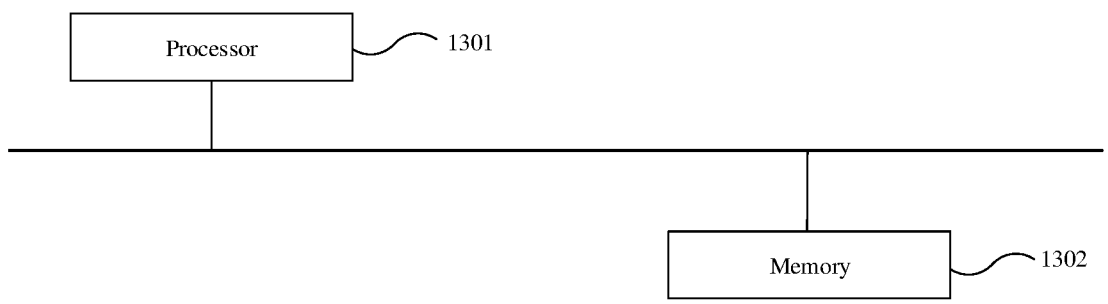
FIG. 13 is a schematic structural diagram of an electronic device according to an embodiment of this application.

FIG. 13 is a schematic structural diagram of an electronic device according to an embodiment of this application. As shown in FIG. 13, the electronic device may include a processor 1301 and a memory 1302. The memory 1302 is configured to store a program, and the processor 1301 invokes the program stored in the memory 1302 to perform the foregoing method embodiments, with similar specific implementation and similar technical effects, which are not described in detail herein.

The electronic device may be various different types of devices, such as a server of a service provider, a device associated with a client (for example, a client device), a system on chip, and/or any other appropriate electronic device. An example of the electronic device includes but is not limited to a desktop computer, a server computer, a notebook computer or netbook computer, a mobile device (for example, a tablet computer, a cellular or other wireless phones (for example, a smart phone), a notepad computer, and a mobile station), a wearable device (for example, glasses and a watch), an entertainment device (for example, an entertainment appliance, a set-top box communicatively coupled to a display device, and a game console), a television or another display device, or an automotive computer.

The processor 1301 may be implemented as one or more microprocessors, microcomputers, microcontrollers, digital signal processors, central processing units, state machines, logic circuits, and/or any devices that manipulate signals according to operation instructions.

An embodiment of this application further provides a computer-readable storage medium, where the storage medium stores a computer program, and when the computer program is read and executed, the foregoing method embodiments are implemented. The computer-readable storage medium may be an ROM, a random access memory (RAM), a CD-ROM, a magnetic tape, a floppy disk, an optical data storage device, or the like.

This application further provides a computer program product, for example, a computer-readable storage medium. The computer program product includes a computer program, where when executed by a processor, the program is used to perform the foregoing method embodiments.

In conclusion, it should be noted that the above examples are merely intended for describing the technical solutions of this application but not for limiting this application. Although this application is described in detail with reference to the foregoing examples, persons of ordinary skill in the art should understand that they may still make modifications to the technical solutions described in the foregoing examples or make equivalent replacements to some or all technical features thereof without departing from the scope of the technical solutions of the examples of this application. All such modifications and replacements shall all fall within the scope of claims and specification of this application. In particular, as long as there is no structural conflict, the various technical features mentioned in the embodiments can be combined in any manners. This application is not limited to the specific embodiments disclosed in this specification, but includes all technical solutions falling within the scope of the claims.

What is claimed is:

1. A tab bending detection method, comprising:
    performing a skeleton extraction on a sectional image of multiple layers of tabs, to obtain a skeleton image of the multiple layers of tabs;
    merging damaged connected components in the skeleton image to obtain a merged connected component, wherein the damaged connected components are connected components on which breaking occurs in a same tab section;
    calculating a target number of the multiple layers of tabs based on the merged connected component and an undamaged connected component; and
    detecting, based on the target number and a preset number, whether any tab in the multiple layers of tabs is in a bending state;
    wherein merging the damaged connected components in the skeleton image to obtain a merged connected component comprises:
        under a condition that an endpoint of a connected component is in a preset region of the skeleton image, determining, based on the endpoint, a first foreground point and a second foreground point that are adjacent to the endpoint, wherein the endpoint, the first foreground point, and the second foreground point are in different connected components; and
        merging the connected component in which the endpoint is located, a first connected component in which the first foreground point is located, and a second connected component in which the second foreground point is located, to obtain the merged connected component.

2. The method according to claim 1, wherein the merging the connected component in which the endpoint is located, a first connected component in which the first foreground point is located, and a second connected component in which the second foreground point is located, to obtain the merged connected component comprises:
    determining a first distance between the endpoint and the first foreground point and a second distance between the endpoint and the second foreground point; and
    under a condition that the first distance is less than the second distance, merging the first connected component in which the first foreground point is located and the connected component in which the endpoint is located to obtain the merged connected component; or
    under a condition that the second distance is less than the first distance, merging the second connected component in which the second foreground point is located and the connected component in which the endpoint is located to obtain the merged connected component.

3. The method according to claim 1, wherein the calculating a target number of the multiple layers of tabs based on the merged connected component and an undamaged connected component comprises:
    traversing each third connected component of the merged connected component and the undamaged connected component to calculate the number of tabs in each third connected component;
    adding the numbers of tabs in all third connected components together to obtain a first target number; and
    determining the target number of the multiple layers of tabs based on the first target number and the numbers of endpoints in a preset region of the merged connected component and the undamaged connected component.

4. The method according to claim 3, wherein the determining the target number of the multiple layers of tabs based on the first target number and the numbers of endpoints in a preset region of the merged connected component and the undamaged connected component comprises:
    under a condition that the numbers of endpoints in a preset region are the same as the preset number, using the number of endpoints in a preset region as the target number; or
    under a condition that the numbers of endpoints in a preset region are different from the preset number, determining a greatest value of the numbers of endpoints in a preset region and the first target number; and determining the target number based on the greatest value and the preset number.

5. The method according to claim 4, wherein the determining the target number based on the greatest value and the preset number comprises:

under a condition that the greatest value is less than or equal to the preset number, using the greatest value as the target number; or under a condition that the greatest value is greater than the preset number, traversing each fourth connected component among the damaged connected components and the undamaged connected component to calculate the number of tabs in each fourth connected component;

adding the numbers of tabs in all fourth connected components together to obtain a second target number; and using the second target number as the target number.

6. The method according to claim 3, wherein the calculating the number of tabs in each third connected component comprises:

determining sample points in each third connected component;

in a preset horizontal direction, sorting, based on a position of each third connected component, the sample points in each third connected component to obtain a sorting result; and determining the number of tabs in each third connected component based on the sorting result and a preset threshold.

7. The method according to claim 6, wherein the determining the number of tabs in each third connected component based on the sorting result and a preset threshold comprises:

determining, based on the sorting result, whether a distance between two adjacent sample points is greater than the preset threshold;

if greater, determining the number of tabs on a vertical section between the two adjacent sample points; and determining the number of tabs in each third connected component based on the numbers of tabs on the vertical section between the two adjacent sample points.

8. The method according to claim 3, wherein the determining sample points in each third connected component comprises:

determining branchpoints, first-type endpoints, and second-type endpoints in each third connected component;

removing burr points from the first-type endpoints and the second-type endpoints to obtain processed endpoints; and using the processed endpoints and the branchpoints as the sample points.

9. An electronic device, comprising a memory and a processor, wherein the memory stores a computer program for execution by the processor, and the computer program comprises instructions for:

performing a skeleton extraction on a sectional image of multiple layers of tabs, to obtain a skeleton image of the multiple layers of tabs;

merging damaged connected components in the skeleton image to obtain a merged connected component, wherein the damaged connected components are connected components on which breaking occurs in a same tab section;

calculating a target number of the multiple layers of tabs based on the merged connected component and an undamaged connected component; and detecting, based on the target number and a preset number, whether any tab in the multiple layers of tabs is in a bending state;

wherein the instructions for merging the damaged connected components in the skeleton image to obtain a merged connected component comprises instructions for:

under a condition that an endpoint of a connected component is in a preset region of the skeleton image determining, based on the endpoint, a first foreground point and a second foreground point that are adjacent to the endpoint, wherein the endpoint the first foreground point, and the second foreground point are in different connected components; and merging the connected component in which the endpoint is located, a first connected component in which the first foreground point is located, and a second connected component in which the second foreground point is located, to obtain the merged connected component.

10. A non-transitory computer-readable storage medium storing a computer program thereon for execution by a processor, wherein the computer program comprises instructions for performing the method of claim 1.

* * * * *